(12) United States Patent
Saez Martínez et al.

(45) Date of Patent: Mar. 23, 2021
(10) Patent No.: US 10,956,799 B2

(54) METHOD FOR DETECTING AND RECOGNIZING LONG-RANGE HIGH-DENSITY VISUAL MARKERS

(71) Applicant: Universidad de Alicante, Alicante (ES)

(72) Inventors: Juan Manuel Saez Martínez, Alicante (ES); Francisco Escolano Ruiz, Alicante (ES); Miguel Ángel Lozano Ortega, Alicante (ES); Javier Pita Lozano, Alicante (ES)

(73) Assignee: Universidad de Alicante, Alicante (ES)

( * ) Notice: Subject to any disclaimer, the term of this patent is extended or adjusted under 35 U.S.C. 154(b) by 33 days.

(21) Appl. No.: 16/463,873

(22) PCT Filed: Mar. 3, 2017

(86) PCT No.: PCT/ES2017/070122
§ 371 (c)(1),
(2) Date: May 24, 2019

(87) PCT Pub. No.: WO2018/115542
PCT Pub. Date: Jun. 28, 2018

(65) Prior Publication Data
US 2019/0294936 A1    Sep. 26, 2019

(30) Foreign Application Priority Data
Dec. 20, 2016 (ES) ............................. ES201631625

(51) Int. Cl.
| G06K 19/06 | (2006.01) |
| G06F 11/10 | (2006.01) |
| G06T 3/40 | (2006.01) |

(52) U.S. Cl.
CPC ...... *G06K 19/0614* (2013.01); *G06F 11/1004* (2013.01); *G06K 19/06037* (2013.01); *G06T 3/4007* (2013.01); *G06K 2019/06225* (2013.01)

(58) Field of Classification Search
CPC .......................... G06K 19/0614; G06K 19/06
See application file for complete search history.

(56) References Cited

U.S. PATENT DOCUMENTS

| 6,809,742 B1 * | 10/2004 | Motosugi ............. H04N 1/3873 345/619 |
| 7,032,823 B2 * | 4/2006 | Nojiri ............... G06K 19/06131 235/462.09 |
| 2014/0270511 A1 * | 9/2014 | Mesh-Iliescu ............ G06T 9/00 382/166 |

OTHER PUBLICATIONS

R. Stevenson, "Laser Marking Matrix Codes on PCBs" Printed Circuit Design and Manufacture, Dec. 2005, pp. 32-36.
(Continued)

*Primary Examiner* — Tuan H Nguyen
(74) *Attorney, Agent, or Firm* — Collard & Roe, P.C.

(57) ABSTRACT

The proposal relates to a complete system of long-range, high-density visual markers (marker design and detection method). In the design, a conventional location system for the long-range markers is used. The proposal therefore focuses on a system for coding information, which in this case is a colour-based code having four states, duplicating the code density with respect to conventional black-and-white systems. Moreover, the detection method requires very few computational resources, making it very efficient and especially suitable for mobile devices. To a great extent, the success of the technique lies in the methods proposed for the treatment of the colour.

3 Claims, 5 Drawing Sheets

(56) References Cited

OTHER PUBLICATIONS

D. Parikh, G. Jancke, "Localization and Segmentation of a 2D High Capacity Color Barcode," IEEE Applications of Computer Vision, 2008, pp. 1-7.
H. Kato, M. Billinghurst, "Marker Tracking and HMD Calibration for a Video-based Augmented Reality Conferencing System", IEEE and ACM International Workshop on Augmented Reality (IWAR), Oct. 1999, total of 10 pages.
H. Kato, "ARToolKit: library for Vision-Based augmented reality", Institute of Electronics, Information and Communication Engineers Technical Report, 2002, total of 8 pages (with English Abstract on p. 1).
E. Olson, "AprilTag: A robust and flexible visual fiducial system", IEEE International Conference on Robotics and Automation (ICRA), 2011, total of 8 pages.
S. Garrido, R. Muñoz, FJ Madrid, MJ Marin, "Automatic generation and detection of highly reliable fiducial markers under occlusion" Pattern Recognition, 2014, pp. 1-14.
J. Coughlan, R. Manduchi, M. Mutsuzaki, H. Shen, "Rapid and Robust Algorithms for Detecting Colour Targets", 10th Congress of the International Colour Association, Spain, May 2005, pp. 959-962, http://www.uco.es/investiga/grupos/ava/node/26.
International Search Report of PCT/ES2017/070122, dated Jun. 2, 2017.

\* cited by examiner

METHOD FOR DETECTING AND RECOGNIZING LONG-RANGE HIGH-DENSITY VISUAL MARKERS

CROSS REFERENCE TO RELATED APPLICATIONS

This application is the National Stage of PCT/ES2017/070122 filed on Mar. 3, 2017, which claims priority under 35 U.S.C. § 119 of Spanish Application No. P201631625 filed on Dec. 20, 2016, the disclosures of which are incorporated by reference. The international application under PCT article 21(2) was not published in English.

OBJECT OF THE INVENTION

The object of the present invention is an efficient system of long-range, high-density visual markers. The present invention presents a new type of visual markers and a method for detecting and recognising them by means of the camera of a mobile device, for the purpose of being used as a guide for the visually impaired.

STATE OF THE ART

An artificial marker is an element which is intentionally introduced in a scene and contains some type of information in order to label or signal it. When the marker is configured so that its information is captured and interpreted through the digital camera of a portable electronic device (e.g. a smartphone or tablet), the marker is referred to as a "visual marker". Unlike other one-dimensional markers, such as barcodes, visual markers usually provide information in a two-dimensional form.

When a visual marker is conceived to hold a large amount of information, it is referred to as a dense marker. To hold said information, dense markers are usually made up of a large number of visual elements. This means that to obtain a correct reading, the image must be sharp, well lit and close enough to the objective (typically 20-50 cm). In other words, these markers are not suitable for being captured from long distances or in unfavourable optic conditions, such as poor lighting of the area, blurring due to sudden camera movements, among others. This group of markers includes many everyday examples such as QR codes (http://www.qrcode-.com) or the Datamatrix system [R. Stevenson, "*Laser Marking Matrix Codes on PCBs*", Printed Circuit Design and Manufacture, 2007]. These codes are usually dichromatic, i.e., made up of elements in black and white, although there are exceptions such as the so-called HCCBs (High Capacity Colour Barcodes), two-dimensional colour markers developed by Microsoft [D. Parikh, G. Jancke, "*Localization and segmentation of a 2D high capacity colour barcode*", IEEE Applications of Computer Vision, 2008]. In this last case, the colour provides more dense information, but it is also the source of greater difficulties when it comes to reading the code, since the user must correctly centre the marker in an area of the image so that the algorithm may correctly capture it.

Moreover, in the state of the art we also find "long-distance markers", which were conceived for being captured quickly and from long distances, typically from 5 to 7 meters and in different lighting conditions. These long-distance markers are very widespread in augmented reality applications, although they are also used in other contexts, such as mobile robotics, by means of landmarks. Markers of this type usually hold much less information than dense markers because when information is added, the geometry of the marker becomes more complicated, seriously affecting its detection from a distance.

In the state of the art, primarily three types of long-distance markers are known. ARToolkit is the most widespread and is used in augmented reality applications, as explained in [H. Kato, M. Billinghurst, "*Marker tracking and hmd calibration for a video-based augmented reality conferencing system*", IEEE and ACM International Workshop on Augmented Reality (*IWAR*), October 1999] as well as in [H. Kato, "*ARToolkit: library for Vision-Based augmented reality*", Institute of Electronics, Information and Communication Engineers Technical Report, 2002]. These markers are made up of a black frame on a white background containing a black-and-white drawing, which is used to distinguish between two markers. This form of distinction between markers is not very effective and is basically applied to distinguish a marker from any other black frame in the scene, not to distinguish many markers from another. Therefore, it is basically limited to applications with a single marker. The development of markers of this type has led to systems which incorporate information, such as in [E. Olson, "*AprilTag: A robust and flexible visual fiducial system*", IEEE International Conference on Robotics and Automation (*ICRA*), 2011] and in [S. Garrido, R. Muñoz, F. J. Madrid, M. J. Marín, "*Automatic generation and detection of highly reliable fiducial markers under occlusion*" Pattern Recognition, 2014].

The marker location system in these cases is the same, that is, a black frame on a white background, and they basically differ by the coding used for holding the information. The first system uses a 6×6 dichromatic element grid. These 36 elements host a binary code containing both the message and an error detecting/correcting-code which allows it to rule out symmetries and ambiguities and generates 500 different codes. The second system uses a smaller grid (5×5) and applies a variation of Hamming codes, which allows to achieve 10 bits of information (1024 combinations), with the rest being occupied by the error detecting/correcting-code.

The technical problem resolved by the present invention lies in the fact that among all the different types of markers, there is no intermediate system which simultaneously allows to detect the marker from long distances and holds a sufficient amount of information.

Current visual markers are very useful because they provide information about the surrounding area which can be captured through the camera of a mobile device; however, they are not altogether useful for the blind: informative markers require camera framing, which entails an important challenge for a blind person, and long-range markers are very limited in terms of the amount of information such as, for example, price tags in a supermarket or indications in an airport.

This is not the first attempt to create a system of artificial markers for mobile devices in the framework of applications for the blind. In [J. Coughlan, R. Manduchi, M. Mutsuzaki, H. Shen, "*Rapid and Robust Algorithms for Detecting Colour Targets*", Congress of the International Colour Association, Spain, May 2005] there is described a marker model proposed exclusively for mobile applications for this group. In this case, it is a single marker model which does not hold information, which largely limits its applications.

DESCRIPTION OF THE INVENTION

An objective of the present invention is a hybrid (long-range, dense) visual marker for mobile devices in the context of guiding the blind. The present invention proposes a method which brings together the best of each family, that is, it houses a sufficient amount of information and it can be detected in an efficient manner in different lighting conditions and at a reasonable distance.

The marker object of the present invention shares structural similarities with some long-range markers such as those described in [E. Olson, "*AprilTag: A robust and flexible visual fiducial system*", IEEE International Conference on Robotics and Automation (ICRA), 2011] and in [S. Garrido, R. Muñoz, F. J. Madrid, M. J. Marín, "*Automatic generation and detection of highly reliable fiducial markers under occlusion*" Pattern Recognition, 2014].

In this sense, it has the same location system (black frame on a white background) widely used in the family of long-range markers. A grid containing the data will be housed in said frame.

Nevertheless, the basic difference between the marker proposed in the present invention and the marker known in the state of the art is that the grid is made up of elements having four states (four tones) whereas the previously described methods use a grid having two states (black and white). As a result of this feature, given the same grid size, the marker model object of the present invention works with twice the code density.

Therefore, if the code has n elements, the marker of the present invention handles $4^n$ combinations compared to the $2^n$ combinations of a marker having two states. This difference does not change the resolution of the elements of the marker, so it maintains its features as a long-range marker, but with a much higher code density.

The present invention is defined on any combination of four colours, without them necessarily being four specific colours, since the marker design includes the colour palette used by each marker. Nevertheless, although the four tones chosen for the palette may be any four tones, they should be distinguishable from one another to avoid ambiguities and thereby improve the reading of the marker. Therefore, a preferred embodiment of the invention is the CMYK (cyan, magenta, yellow, black) combination corresponding with the four outermost corners in the cube defined by the RGB (red, green, blue) colour space.

The following elements can be found in the grid:
(a) The palette is included in the four corners of the grid, i.e., in each corner of the grid there is a basic colour of the colour palette, so, for example, in case of the CMYK combination, in each of the corners there will be one colour (cyan in a first corner, magenta in a second, yellow in a third, and black in a fourth). To render the marker invariant to rotation, it is considered that the darkest element is always the last value of the palette. The introduction of the palette solves the problem of identifying the colours of the marker, which prevents the effects of degradation of the colour, because once it is extracted, a reference of each colour is obtained and can be used to label the rest of the data grid by means of a colour proximity criterion.
(b) The central element determines the grid size from among four possible sizes (5×5, 7×7, 9×9, 11×11). The choice of the size will depend on the needs of each application.
(c) The central row and column, except the central cell, define the cyclic redundancy check (CRC). The CRC is calculated from the message and included in the marker. In the step of detecting the marker, the message is extracted, the CRC is recalculated and compared with the one accompanying the marker to validate the integrity of the message.
(d) The rest of the elements are dedicated to the message. Once the marker design has been determined according to the present invention, the method for detecting and recognising it in a digital image comprises the steps of:
(i) Detecting the black and white frames, locating the coordinates of their corners. For this first step, a frame detection algorithm is applied on the image to detect a first set of candidates. The state of the art describes a plurality of algorithms which approach this problem. Nevertheless, a particular embodiment proposes the algorithm described in [S. Garrido, R. Muñoz, F. J. Madrid, M. J. Marín, "*Automatic generation and detection of highly reliable fiducial markers under occlusion*", Pattern Recognition, 2014], although any other method can be used for the same purpose.
(ii) Obtaining from each detected frame a grid by means of bilinear interpolation, with the coordinates of the centre of each cell, and also taking into account the boxes of the black and white frames.
(iii) Obtaining the colour of each cell. Given that said centre is in real coordinates and the image is in discrete coordinates, a 4-neighbour point bilinear interpolation is performed to obtain said value.
(iv) Calculating the arithmetic mean of the colours of the black and white frames for obtaining a reference white and a reference black.
(v) Normalise the colour of each cell from the reference black and white obtained in the preceding step by establishing a white balance.
(vi) Correcting the orientation of the marker taking into account that the darkest corner must be in the last position of the palette.
(vii) Obtaining the palette from the corners and labelling the marker indicating which value of the palette corresponds to each cell.
(viii) Verifying that the marker belongs to the desired family by analysing whether the central label is what was expected (the method is configured to search for markers of a specific size defined by the application, therefore this step is necessary for ruling out markers of any other size that may be contained in the scene). It must be taken into account that as the algorithm is described, it is launched for a specific size. For example, a crosswalk signalling application would use the 5×5 size, which has few combinatorics, but a supermarket product labelling application would use the 7×7 size. Each application is capable of detecting only one type of marker.
(ix) Composing the message and the CRC.
(x) Verifying the integrity of the message, recalculating the CRC from it and comparing it with the CRC read from the code.

A first objective of the present invention is to combine high-density and long-range, thereby overcoming the difficulty existing systems have because these two features are not offered simultaneously.

A second objective of the present invention is to establish a method with low computational complexity, which allows to detect the marker in a very efficient manner on devices with a low computation capacity, such as smartphones.

A third objective of the present invention is to carry out a robust colour processing by including the palette and the white balance, improving the robustness of the invention in the detection of visual markers.

The foregoing is in accordance with the independent claims enclosed in the present specification. The particular embodiments of the invention are indicated in the claims depending on the independent claims, all of which are incorporated by reference in this section.

Throughout the description and claims the word "comprises" and variants thereof do not intend to exclude other technical features, additions, components, or steps. For one skilled in the art, other objects, advantages, and features of the invention will be inferred in part from description and in part from putting the invention into practice. The following examples and drawings are provided by way of illustration and do not intend to restrict the present invention. Furthermore, the present invention covers all the possible combinations of particular and preferred embodiments herein indicated.

BRIEF DESCRIPTION OF THE DRAWINGS

A series of drawings which help to better understand the invention and which are expressly related to an embodiment of said invention presented as a non-limiting example thereof are very briefly described below.

DETAILED DESCRIPTION OF AN EMBODIMENT OF THE INVENTION

Figure 1:
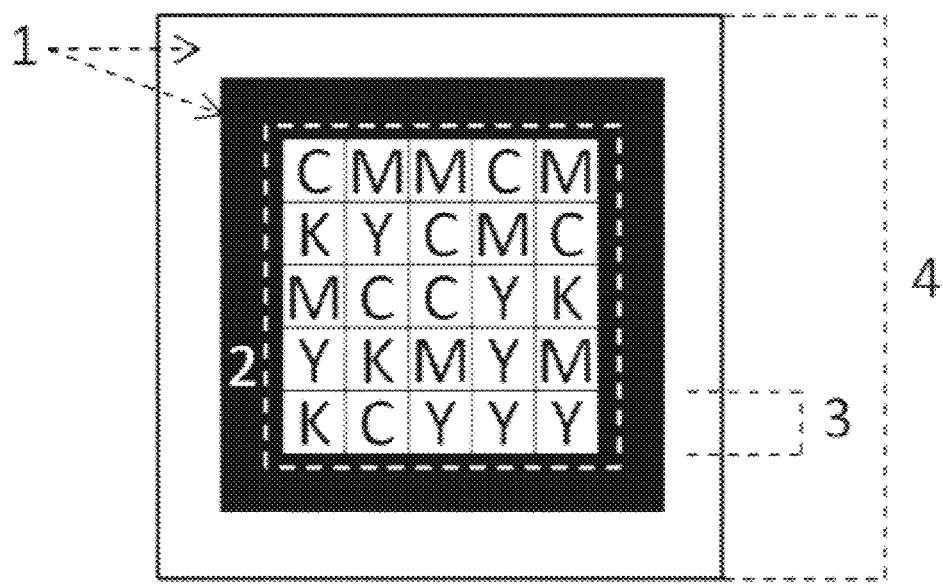
FIG. 1 shows a diagram of the proposed marker, where can be observed the location frames (1) and a grid of N×N elements (2) holding the data (5×5 in this practical embodiment, labelled with the letters C, M, Y, K, representing the colour of each cell, i.e., cyan, magenta, yellow and black, respectively). Both the elements of the grid and the location frames have the same size and a square shape, so with l being the size of a side of a cell of the grid (3), the total area of the marker (4) is $(l(N+4))^2$.

The proposed marker design is based on a grid of N×N elements which can take up to four different colours inside a black frame which, in turn, is inside a white frame, as can best be seen in FIG. 1. As can be seen, the size of the side l of the cells of the data grid determines the width of the location frames and, therefore, the total size of the marker.

The colour palette is made up of the four colours which are going to be used in the marker:

$$P=[p_0,p_1,p_2,p_3]$$

Figure 2:
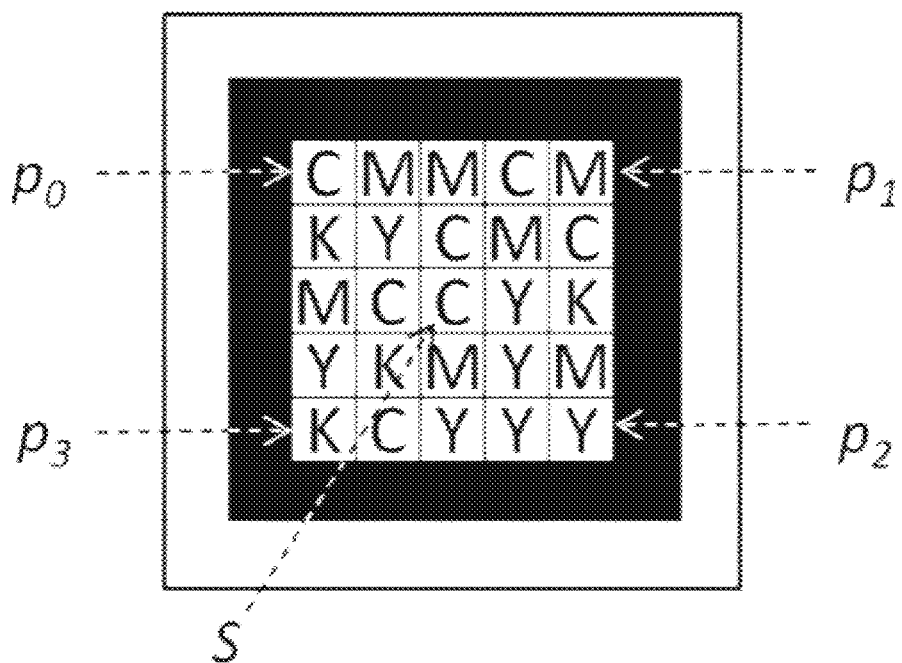
FIG. 2 shows the inclusion of the palette $P=[p_0,p_1,p_2,p_3]$ in the actual marker, located in the corners of the data grid in a clockwise order and with reference to the element with the lowest luminance (black in the case of CMYK) which determines $p_3$. The type of the marker S determines its size N and is placed in the central cell of the grid.

This palette is introduced in the actual marker, specifically in the four corners of the data grid, as can be seen in FIG. 2. The palette is introduced in a clockwise order and its reference (last element $p_3$) is marked by the darkest element (the one with the lowest luminance).

Figure 3:
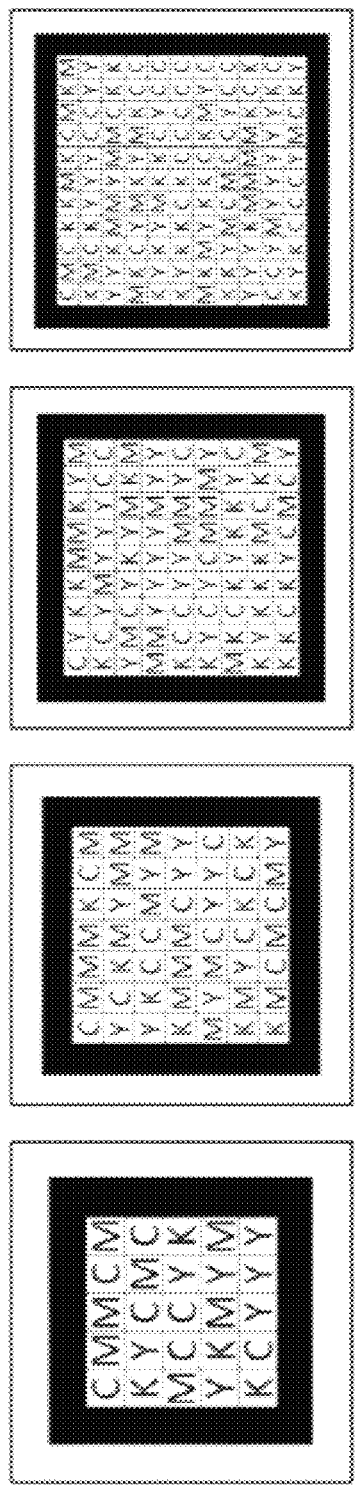
FIG. 3 shows examples of markers of the four sizes defined. From bottom to top: 5×5, 7×7, 9×9, 11×11. Since the CMYK palette has been used, the central element of the grid takes the cyan value in the 5×5 size, magenta in the 7×7 size, yellow in the 9×9 size, and black in the 11×11 size.

It is possible to have grids of size $N \in \{5,7,9,11\}$ according to the needs of the application. In order to determine the size of the grid of the current marker, the cell in the central position of the grid is consulted. Note that the four sizes that the grid may have (i.e. $N=\{5,7,9,11\}$) are uneven, then there is always a clear central position. This central cell, like the rest of the cells of the grid, can take any of the values of the palette $S \in \{p_0,p_1,p_2,p_3\}$ corresponding, respectively, with the possible sizes $\{5,7,9,11\}$ of the grid (see FIG. 3).

Taking into account that each cell holds 2 bits (i.e. four combinations) a marker of N×N elements contains $2N^2-4N-6$ bits of data and $4N-4$ bits of CRC. Therefore, the CRC length grows in accordance with the message length. Table 1 shows, for each marker size, the message length, the CRC length, and the generator polynomial used for the calculation. In this sense, standard generator polynomials have been used (which have proven effectiveness) in accordance with each length.

TABLE 1

| N × N | Message length | CRC length | CRC Polynomial |
| --- | --- | --- | --- |
| 5 × 5 | 24 bits | 16 bits | CRC-16-CDMA2000 |
| 7 × 7 | 64 bits | 24 bits | CRC-24-Radix-64 |
| 9 × 9 | 120 bits | 32 bits | CRC-32Q |
| 11 × 11 | 192 bits | 40 bits | CRC-40-GSM |

To observe the effect of the inclusion of the colour on the density of the message, and as comparative data, the 5×5 system described in [S. Garrido, R. Muñoz, F. J. Madrid, M. J. Marín, "*Automatic generation and detection of highly reliable fiducial markers under occlusion*", Pattern Recognition, 2014] provides 1024 combinations, and the 6×6 system described in [E. Olson, "*AprilTag: A robust and flexible visual fiducial system*", IEEE International Conference on Robotics and Automation (ICRA), 2011] provides only 500 combinations, whereas the present invention, in its least dense version (5×5), is capable of handling 24 bits of message, that is, 16,777,216 combinations.

The steps of the method for detecting the marker are summarized below. Given an image l(x,y) and a marker size $N \in \{5,7,9,11\}$, extract the frames $M=\{m_0, m_1, \ldots, m_{k-1}\}$ of l(x,y) and for each $m_i \in M$:
1) Obtain coordinates $G_i(x,y)$ of (N+4)×(N+4) from $m_i$
2) Obtain the colours from the data $C_i(x,y)$, the white reference $R_i^b$ and the black reference $R_i^n$ from $G_i$
3) Normalise $C_i'(x,y)=(C_i(x,y)-R_i^n)/(R_i^b-R_i^n)$
4) Obtain $C_i''$ by orienting $C_i'$ with its reference corner.
5) Obtain palette $P_i=[p_0,p_1,p_2,p_3]$ from the corners of $C_i''$
6) Label $E_i(x,y)$ by the nearest neighbour of $C_i''(x,y)$ to $P_i$
7) If $E_i([N/2],[N/2])=(N-5)/2$ holds, then:
   Extract message $I_i^m$ and CRC $I_i^c$ from $E_i$
   Calculate the CRC of $I_i^m$. If it is consistent with $I_i^c$, add $I_i^m$ to T.

Figure 4:
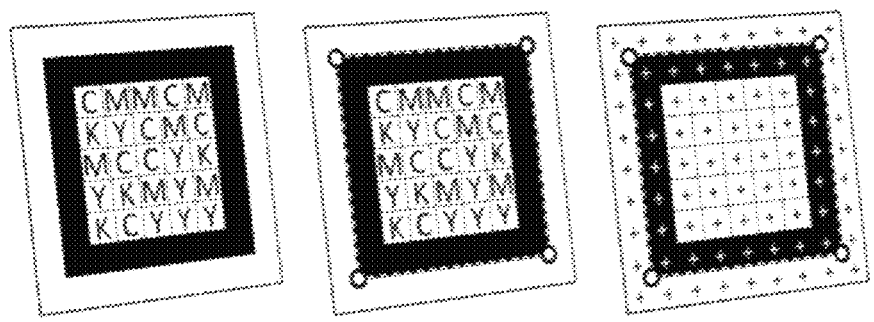
FIG. 4 shows an original image (on the left in FIG. 4). By applying a frame detection algorithm, the four corners defining the location frame (in the centre in FIG. 4) are obtained. From the coordinates of the frame, a grid with (N+4)×(N+4) coordinates is obtained, covering both the information cells and the frames (on the right of FIG. 4).

Therefore, given a digital colour image I(x,y) captured by the camera of the device and the desired size of the marker $N \in \{5,7,9,11\}$, for detecting a set of markers T contained in this image, in first place, it is applied a frame detection algorithm. As a result of the frame detection algorithm on the image I(x,y), a set of frames $M=\{m_0, m_1, \ldots, m_{k-1}\}$ contained in the image is obtained. Each frame is defined by four coordinates $m_i=(c_0, c_1, c_2, c_3)$ on the space of the image, corresponding with the outer corners of the frame in a clockwise order (see centre of FIG. 4).

Each detected frame $m_i$ represents a possible marker. Taking as a reference the four coordinates of the frame $m_i=(c_0, c_1, c_2, c_3)$, bilinear interpolation is performed to obtain a grid $G_i(x,y)$ of $(N+4)\times(N+4)$ equidistant coordinates. This grid contains the coordinates of the centres of the N×N cells of information of the marker, 4N+4 coordinates on the black frame and 4N+12 coordinates on the white frame (see right side of FIG. 4).

For each coordinate of $G_i$, the corresponding colour in image $I(G_i(x,y))$ is obtained (taking into account that $G_i$ is in real coordinates and the image is in discrete coordinates, this colour is obtained by a 4-neighbour point bilinear interpolation). With the $(N+4)\times(N+4)$ colours obtained, $C_i$ is taken as the N×N grid of colours belonging to the data of the marker and $R_i^b$ and $R_i^n$ as the arithmetic means of the colours belonging to the black and white frames, respectively.

The values $R_i^b$ and $R_i^n$ play an essential role in the present invention, since they represent the black and white reference of the marker. Therefore, the location frames can be used not only to locate the marker but also to perform a white balance and thereby treat the colour in a robust manner. To that end, $C_i'$ is formed from $C_i$ normalising each of the cells as follows:

$$C_i'(x,y)=(C_i(x,y)-R_i^n)/(R_i^b-R_i^n).$$

Although $C_i'$ contains a normalised reference of the colour of the N×N cells of the marker, the orientation is still unknown, since the frame detection algorithm does not provide this information (the frame does not contain orientation information). To resolve this, the corners of the marker will be taken into account:

$$\{C_i'(0,0), C_i'(N-1,0), C_i'(N-1,N-1), C_i'(0,N-1)\}$$

They contain the palette in a clockwise order, with reference in the darkest element in its last position. Therefore, from the 4 possible orientations of $C_i'$, the one leaving the darkest element (the lowest luminance) of the four corners in $C_i'(0,N-1)$ is selected, obtaining $C_i''$.

Using the ordered colour samples, the colour palette of the four corners is obtained:

$$P_i=[p_0,p_1,p_2,p_3]=[C_i''(0,0),C_i''(N-1,0),C_i''(N-1,N-1),\\C_i''(0,N-1)]$$

The labelling $E_i(x,y)$ of the marker is obtained from the palette. It is a matrix which indicates for each cell the index value of the palette to which it corresponds. To that end, a nearest neighbour classification is performed (assigning the index of the palette with the colour value nearest to the colour of the cell):

$$E_i(x,y)=\operatorname{argmin}_{k\in\{0,1,2,3\}}\|C_i''(x,y)-p_k\|.$$

To calculate the Euclidean distance $\|.\|$ between two colours, the CIE 1976 L*a*b* colour space is recommended since this space is isotropic (unlike other spaces such as RGB), which justifies the use of this distance function.

Once the labelling of the cells has been obtained, it is necessary to verify if the marker which is being analysed is from the desired family of markers. To that end, it is necessary to verify that the size specified in the central cell coincides with the desired marker size, that is:

$$E_i([N/2],[N/2])=(N-5)/2.$$

Otherwise, the current frame is ruled out from the possible markers.

At this point it is time to extract information from the marker, that is, the message $I_i^m$ and the cyclic redundancy check $I_i^c$. To obtain $I_i^c$, cells are taken from the central column and row (except the central cell which determines the type of marker), and a single number of 4N−4 bits is formed with the labels of the cells in binary (labels [0,1,2,3] correspond with binary codes [00,01,10,11]) following the reading order on the matrix (from left to right and from top to bottom).

Likewise, $I_i^m$ is obtained by composing the cells of the message (those which do not correspond with the palette, the CRC, or the marker type), forming a binary number of $2N^2-4N-6$ bits.

To finish detection, the integrity of the message is verified by calculating the cyclic redundancy check of $I_i^m$ with the suitable polynomial (see Table 1) and comparing it with the read CRC $I_i^c$. If both codes coincide, the message is considered valid and $I_i^m$ is added to the set of markers T detected in the current image $I(x,y)$.

Example 1. Results of the Method

To assure the correct operation of the markers and the detection method proposed in the present invention, a functional prototype has been developed which consists of two applications: a marker generator and detector. Both applications have been developed in C++ in the high-performance cross-platform programming environment Qt SDK (http://www.qt-project.org).

The generator manages a marker database with the information of each marker (marker code, text associated with the marker, real print size, etc.) and allows to create, remove, search for, and print these markers with the selected physical size.

Furthermore, the detector is in charge of detecting the markers on the images obtained from the camera of the device. In this case, it has been developed both for Android and iOS devices. When a marker is detected, the system queries its code in the database and vocalises (using Text To Speech) its content. Furthermore, it also vocalises the real distance at which this marker is located, since the print size of each marker is stored in the database and this information together with the camera information (focal distance and aperture) is used to recover its real scale.

As for performance, the system is capable of processing a mean of 18.6 fps. This data differs depending on the device and camera resolution. In this case, a Samsung Galaxy S6 (SM-G920F) equipped with a Cortex A57 octa-core processor with 2.1 GHz and 3 Gb of RAM memory, with a camera resolution of 1280×720 has been used, and the frame detection has been performed with version 2.0 of the library described in [S. Garrido, R. Muñoz, F. J. Madrid, M. J. Marín, "*Automatic generation and detection of highly reliable fiducial markers under occlusion*", Pattern Recognition, 2014], which is available at the following link: http://www.uco.es/investiga/grupos/ava/node/26.

Taking into account that the camera of the device provides images at 30 fps, by eliminating camera access times the system is capable of processing each frame in a mean time of 20.43 milliseconds in the above-mentioned device.

Regarding the detection distance, it depends on the camera resolution, lighting conditions, and marker size and type. Under favourable lighting conditions (daylight) and with the aforementioned resolution (1280×720), a 5×5 marker printed on a size of 20×20 cm (standard A4 print size) is detected at a maximum distance of 8.12 meters.

Figure 5:
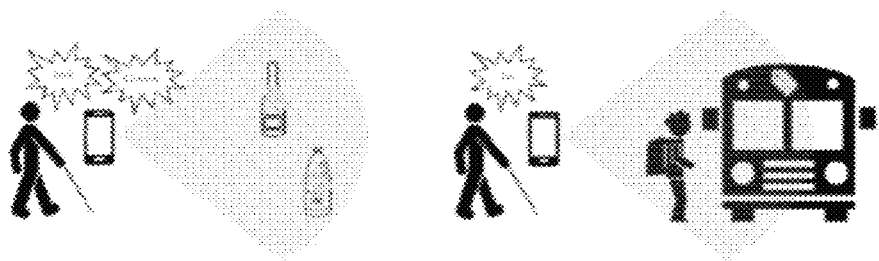
FIG. 5 shows several applications of visual markers for the blind, that is, product labelling (on the left) and signage in an urban context (right).

Markers of this type may be applied to contexts in which both the range and the code density play an important role (see FIG. 5 which shows visual marker applications for the blind) such as, for example, product labelling (on the left) and signage in an urban context (on the right).

The invention claimed is:

1. A detection method for detecting a visual marker in a form of a black frame on a white background, comprising the steps of:

detecting the black frame, locating coordinates of corners of the black frame;

obtaining a grid from the black frame by means of bilinear interpolation, wherein the grid is made up of elements having four different color tones, with the four different color tones being distinguishable from one another and forming a color palette, wherein the grid has a plurality of cells, wherein a central cell of the grid determines a size of the grid, wherein the cells corresponding with a central row and column, except for the central cell, define a cyclic redundancy check and wherein remaining cells forming the grid are elements dedicated to a message that can be transmitted by the visual marker;

obtaining a color of each cell, calculating an arithmetic mean of colors of the black frame and white background for obtaining a reference black and a reference white;

normalizing the color of each cell from the reference black and white by establishing a white balance;

correcting an orientation of the visual marker so that the cell of a darkest corner must be in a last position of the color palette;

obtaining the color palette from the corners and labelling the visual marker indicating which value of the color palette corresponds to each cell;

verifying that the visual marker belongs to a desired family by analyzing whether a central label is what was expected;

composing the message and the cyclic redundancy check; and verifying integrity of the message, recalculating the cyclic redundancy check and comparing the recalculated cyclic redundancy check with the cyclic redundancy check read from a code.

2. The method according to claim 1, where coordinates of a center of each cell are used in a bilinear interpolation, also taking into account the black frames and the white background.

3. The method according to claim 1, wherein to obtain the color of each cell and given that its center is in real coordinates and the image is in discrete coordinates, a 4-neighbor point bilinear interpolation is performed to obtain the color.

* * * * *